(12) United States Patent
Inai et al.

(10) Patent No.: US 8,221,923 B2
(45) Date of Patent: Jul. 17, 2012

(54) STOP METHOD FOR FUEL CELL SYSTEM AND FUEL CELL SYSTEM

(75) Inventors: Shigeru Inai, Shioya-gun (JP); Hiromichi Yoshida, Shioya-gun (JP); Hideo Kato, Utsunomiya (JP); Katsumi Hayashi, Utsunomiya (JP); Ryo Jinba, Utsunomiya (JP); Nobuyuki Matsumoto, Shioya-gun (JP); Takahiro Takai, Utsunomiya (JP); Masao Utsunomiya, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1083 days.

(21) Appl. No.: 11/481,679

(22) Filed: Jul. 6, 2006

(65) Prior Publication Data

US 2006/0251937 A1    Nov. 9, 2006

Related U.S. Application Data

(63) Continuation of application No. 11/015,869, filed on Dec. 16, 2004, now abandoned.

(30) Foreign Application Priority Data

Dec. 19, 2003 (JP) .................................. 2003-422921

(51) Int. Cl.
*H01M 8/04* (2006.01)
(52) U.S. Cl. ........ 429/429; 429/408; 429/415; 429/427; 429/428
(58) Field of Classification Search ............... 429/23, 429/13, 34, 25, 408, 415, 428, 429, 443
See application file for complete search history.

(56) References Cited

U.S. PATENT DOCUMENTS

| 6,379,827 | B1 | 4/2002 | Cipollini |
| 6,635,370 | B2 | 10/2003 | Condit et al. |
| 2002/0076583 | A1 | 6/2002 | Reiser et al. |
| 2002/0102443 | A1* | 8/2002 | Yang et al. ................ 429/13 |
| 2003/0077488 | A1* | 4/2003 | Yamamoto et al. ........... 429/17 |
| 2003/0134164 | A1 | 7/2003 | Reiser et al. |
| 2003/0134165 | A1* | 7/2003 | Reiser et al. ................ 429/13 |
| 2004/0043276 | A1* | 3/2004 | Hoffjann et al. ............. 429/34 |
| 2004/0053089 | A1* | 3/2004 | Balliet et al. ............... 429/22 |

(Continued)

FOREIGN PATENT DOCUMENTS

JP    2-5366    1/1990
(Continued)

OTHER PUBLICATIONS

Japanese Office Action for Application No. 2003-422921, dated Feb. 26, 2008.

*Primary Examiner* — Patrick Ryan
*Assistant Examiner* — Ben Lewis
(74) *Attorney, Agent, or Firm* — Nelson Mullins Riley & Scarborough LLP; Anthony A. Laurentano

(57) ABSTRACT

A stop method for a fuel cell system including a fuel cell unit in which hydrogen is supplied to an anode, and air is supplied to a cathode so as to generate electrical power via an electrochemical reaction. The stop method includes the steps of stopping supply of hydrogen to the anode, electrically connecting the anode and the cathode via an electrical load, and supplying air to the anode.

16 Claims, 2 Drawing Sheets

U.S. PATENT DOCUMENTS

2005/0112454 A1 * 5/2005 Gurin et al. .................... 429/46

FOREIGN PATENT DOCUMENTS

| | | |
|---|---|---|
| JP | 2-18869 | 1/1990 |
| JP | 7-183039 | 7/1995 |
| JP | 7-272737 | 10/1995 |
| JP | 2000-512068 | 9/2000 |
| JP | 2001-118594 | 4/2001 |
| JP | 2001-351666 | 12/2001 |
| JP | 2003-331893 | 11/2003 |
| WO | WO-97/48142 | 12/1997 |
| WO | WO-02/059997 A1 | 8/2002 |

* cited by examiner

STOP METHOD FOR FUEL CELL SYSTEM AND FUEL CELL SYSTEM

RELATED APPLICATIONS

This application is a continuation of U.S. patent application Ser. No. 11/015,869, filed Dec. 16, 2004 which claims priority to Japanese Patent Application No. 2003-422921, filed Dec. 19, 2003, the contents of which are incorporated herein by reference.

FIELD OF THE INVENTION

The present invention relates to a stop method for a fuel cell system and a fuel cell system which are adapted for cold start-up.

DESCRIPTION OF RELATED ART

In recent years, fuel cell powered vehicles have been proposed, each of which includes a fuel cell system as a driving source of the vehicle. As a type of fuel cell system for such vehicles, a fuel cell system is known which includes a predetermined number of cell units stacked one on the other, each of which includes an anode, a cathode, and an electrolyte membrane sandwiched therebetween. When hydrogen is supplied to the anode and air (or oxygen) is supplied to the cathode, electrical power generation is performed via an electrochemical reaction of hydrogen and oxygen which is accompanied by the production of water. Even though water is mainly formed at the cathode during an operation of the fuel cell system, a portion of the water at the cathode may move to the anode through the electrolyte membrane sandwiched between the cathode and the anode. In addition, the reaction gases (hydrogen and oxygen) are humidified in order to prevent the electrolyte membrane from becoming dry.

When the power generation of the fuel cell system is to be stopped, the abovementioned formed water and humidifying water remain in gas flow paths of the fuel cell units; therefore, when the power generation is stopped while water remains therein, the remaining water may freeze at low temperature, and the frozen water (ice) may block supply and discharge of the reaction gases (hydrogen and air), which leads to degradation of start-up performance at low temperature.

To solve this problem, Published Japanese Translation No. 2000-512068 of the PCT International Application discloses a cold start-up method in which a fuel cell system is warmed by making the fuel cell system supply electrical energy to an external electrical circuit. Moreover, in order to improve start-up performance at low temperature, this published document discloses a technology in which formed water remaining in gas flow paths of the fuel cell units is discharged using a nitrogen gas or the like when the operation of the fuel cell system is stopped so as to prevent freezing of water in the gas flow paths during stop periods of the fuel cell system.

In the aforementioned prior art technology, start-up performance at low temperature is improved by discharging water remaining in the gas flow paths of the fuel cell units; however, because a nitrogen gas is used for discharging water remaining in the gas flow paths of the fuel cell units, a tank, such as a dedicated nitrogen container, must be provided in the vehicle, which is a problem in view of limited installation capacity of a fuel cell powered vehicle.

Furthermore, another method has been proposed in which reaction gases (hydrogen and oxidizing agent such as air) are supplied to a fuel cell system during stoppage of the fuel cell system; however, increase in hydrogen consumption is a problem because a significant amount of reaction gas (i.e., hydrogen) that does not contribute to power generation must be supplied to an anode to discharge remaining water at the anode.

In consideration of the above circumstances, an object of the present invention is to provide a stop method for a fuel cell system and a fuel cell system, which can discharge water remaining in gas flow paths in the fuel cell units during stoppage of the fuel cell system, more specifically, water remaining in gas flow paths at the anode, so that start-up performance of the fuel cell system can be improved while deceasing the consumption amount of hydrogen during discharging water remaining in gas flow paths at an anode.

SUMMARY OF THE INVENTION

In order to achieve the above object, the present invention provides the following.

A stop method for a fuel cell system, that includes a fuel cell unit in which hydrogen is supplied to an anode, and air is supplied to a cathode so as to generate electrical power via an electrochemical reaction, the stop method including the steps of: stopping supply of hydrogen to the anode; electrically connecting the anode and the cathode via an electrical load; and supplying air to the anode.

According to the above stop method for a fuel cell system, because air is supplied to the anode while not supplying hydrogen thereto upon stoppage of the fuel cell, water remaining at the anode can be discharged while significantly reducing the amount of consumed hydrogen. As a result, start-up performance of the fuel cell system can be improved due to discharge of water remaining in the gas flow paths upon stoppage of the fuel cell system.

Conventionally, supplying air to the anode had a possibility of causing another problem that hydrogen and oxygen existing in the anode area produce a potential difference inside the anode, a potential difference inside the cathode, and a potential difference between the anode and the cathode, and thereby cause oxidation in the cathode area. On the other hand, in the present invention, the anode and the cathode are electrically connected to each other via the electrical load when air is supplied to the anode while not supplying hydrogen thereto upon stoppage of the fuel cell. In this way, it is possible to dissipate the potential difference inside the anode, the potential difference inside the cathode, and the potential difference between the anode and the cathode by an electron moving from the anode to the cathode, which is produced by an electrochemical reaction between hydrogen remaining in the anode area and oxygen contained in air. Therefore, electrons will not move inside the anode and inside the cathode, and thereby oxidation in the cathode area can be prevented.

As explained above, according to the stop method, start-up performance of the fuel cell system can be improved due to discharge of water remaining in the gas flow paths upon stoppage of the fuel cell system. Accordingly, consumption amount of hydrogen during discharging water remaining in gas flow paths at the anode can be decreased. In addition, oxidation in the cathode area can be avoided, and thereby corrosion in the cathode area can be avoided.

In the abovementioned stop method for a fuel cell system, the fuel cell may be for a fuel cell powered vehicle, and the electrical load may be electrically powered auxiliaries.

In this case, when supply of hydrogen is stopped, by electrically connecting the anode and the cathode via the electrically powered auxiliaries, additional circuit, etc., for electrically connecting the anode and the cathode becomes unnecessary. Accordingly, the number of devices in the fuel cell system will not increase, thereby the complexity of the fuel cell system can be avoided.

In the abovementioned stop method for a fuel cell system, the fuel cell may be for a fuel cell powered vehicle, and the electrical load may be a dummy load for a purging process.

In this case, when supply of hydrogen is stopped, by electrically connecting the anode and the cathode via the dummy load for a purging process when purging water remained at the anode by air, electrical consumption required for releasing a potential difference inside the anode, a potential difference inside the cathode, and a potential difference between the anode and the cathode can be made without using other electrically powered auxiliaries.

Another stop method for a fuel cell system that includes a fuel cell unit in which hydrogen is supplied to an anode, and air is supplied to a cathode so as to generate electrical power via an electrochemical reaction, and a hydrogen circulation path through which unreacted hydrogen is returned to the anode, the stop method including the steps of: stopping supply of hydrogen to the hydrogen circulation path; electrically connecting the anode and the cathode via an electrical load when it is determined that gas pressure in the hydrogen circulation path becomes lower than a predetermined pressure; and supplying air to the hydrogen circulation path.

According to the abovementioned another stop method for a fuel cell system, when supply of a hydrogen gas to the hydrogen circulation path is stopped, and the pressure of gas in the hydrogen circulation path is less than a predetermined pressure, it is determined that the hydrogen gas contained in the hydrogen circulation path has been sufficiently discharged. Thereafter, air is introduced into the hydrogen circulation path, and then is supplied to the anode. Therefore, water remaining at the anode can be sufficiently discharged. Accordingly, since water remaining at the anode is discharged while supply of hydrogen is stopped, the amount of consumed hydrogen can be reduced.

Conventionally, supplying air to the anode may be the cause of another problem that hydrogen and oxygen existing in the anode area produce a potential difference inside the anode, a potential difference inside the cathode, and a potential difference between the anode and the cathode, thereby causing oxidation in the cathode area. On the other hand, in the present invention, the anode and the cathode are electrically connected to each other via the electrical load when air is supplied to the anode via the hydrogen circulation path. In this way, it is possible to release a potential difference inside the anode, a potential difference inside the cathode, and a potential difference between the anode and the cathode by an electron moving from the anode to the cathode, which is produced by an electrochemical reaction between hydrogen remaining in the anode area and oxygen contained in air. Therefore, electrons will not move inside the anode and inside the cathode, and thereby oxidation in the cathode area can be prevented.

As explained above, according to the abovementioned other stop method, start-up performance of the fuel cell system can be improved due to discharge of water remaining in the gas flow paths upon stoppage of the fuel cell system. Accordingly, consumption amount of hydrogen during discharging water can be decreased. In addition, oxidation in the cathode area can be avoided, and thereby corrosion in the cathode area can be avoided.

In the abovementioned stop method for a fuel cell system, the fuel cell may be for a fuel cell powered vehicle, and the electrical load may be electrically powered auxiliaries.

In this case, when supply of hydrogen is stopped, by electrically connecting the anode and the cathode via the electrically powered auxiliaries, additional circuit, etc., for electrically connecting the anode and the cathode becomes unnecessary. Accordingly, the number of devices in the fuel cell system will not increase, and thereby complexity of the fuel cell system can be avoided.

In the abovementioned stop method for a fuel cell system, the fuel cell may be for a fuel cell powered vehicle; and the electrical load may be a dummy load for a purging process.

In this case, when supply of hydrogen is stopped, by electrically connecting the anode and the cathode via the dummy load for a purging process, when purging water remaining at the anode by air, electrical consumption required for releasing a potential difference inside the anode can be consumed without using other electrically powered auxiliaries.

A fuel cell system including: a hydrogen supply path for introducing hydrogen; an air supply path for introducing air containing oxygen; a switching path connected between the hydrogen supply path and the air supply path; a first valve for opening and closing the hydrogen supply path; a second valve for opening and closing the switching path; a fuel cell unit in which hydrogen is supplied to an anode from the hydrogen supply path, and air is supplied to a cathode from the air supply path so as to generate electrical power via an electrochemical reaction; an electrical load electrically connected between the anode and the cathode; a controller for controlling opening and closing of the first valve, opening and closing of the second valve, and connection and termination of an electrical connection between the electrical load, and the anode and the cathode.

In the fuel cell system, the fuel cell may be for a fuel cell powered vehicle, and the electrical load may be electrically powered auxiliaries.

In the fuel cell system, the fuel cell may be for a fuel cell powered vehicle, the electrical load may be a dummy load for a purging process.

The fuel cell system may further include: a hydrogen circulation path through which unreacted hydrogen is returned to the anode; and a pressure sensor for measuring gas pressure in the hydrogen circulation path and transmitting the gas pressure to the controller.

In the fuel cell system, the fuel cell may be for a fuel cell powered vehicle, and the electrical load may be electrically powered auxiliaries.

In the fuel cell system, the fuel cell may be for a fuel cell powered vehicle, the electrical load may be a dummy load for a purging process.

DETAILED DESCRIPTION OF THE INVENTION

One embodiment of a stop method for a fuel cell system and a fuel cell system according to the present invention will be explained below with reference to the figures. The embodiment to be explained below is an example of a stop method for a fuel cell system that is to be installed in a fuel cell powered vehicle.

Figure 1:
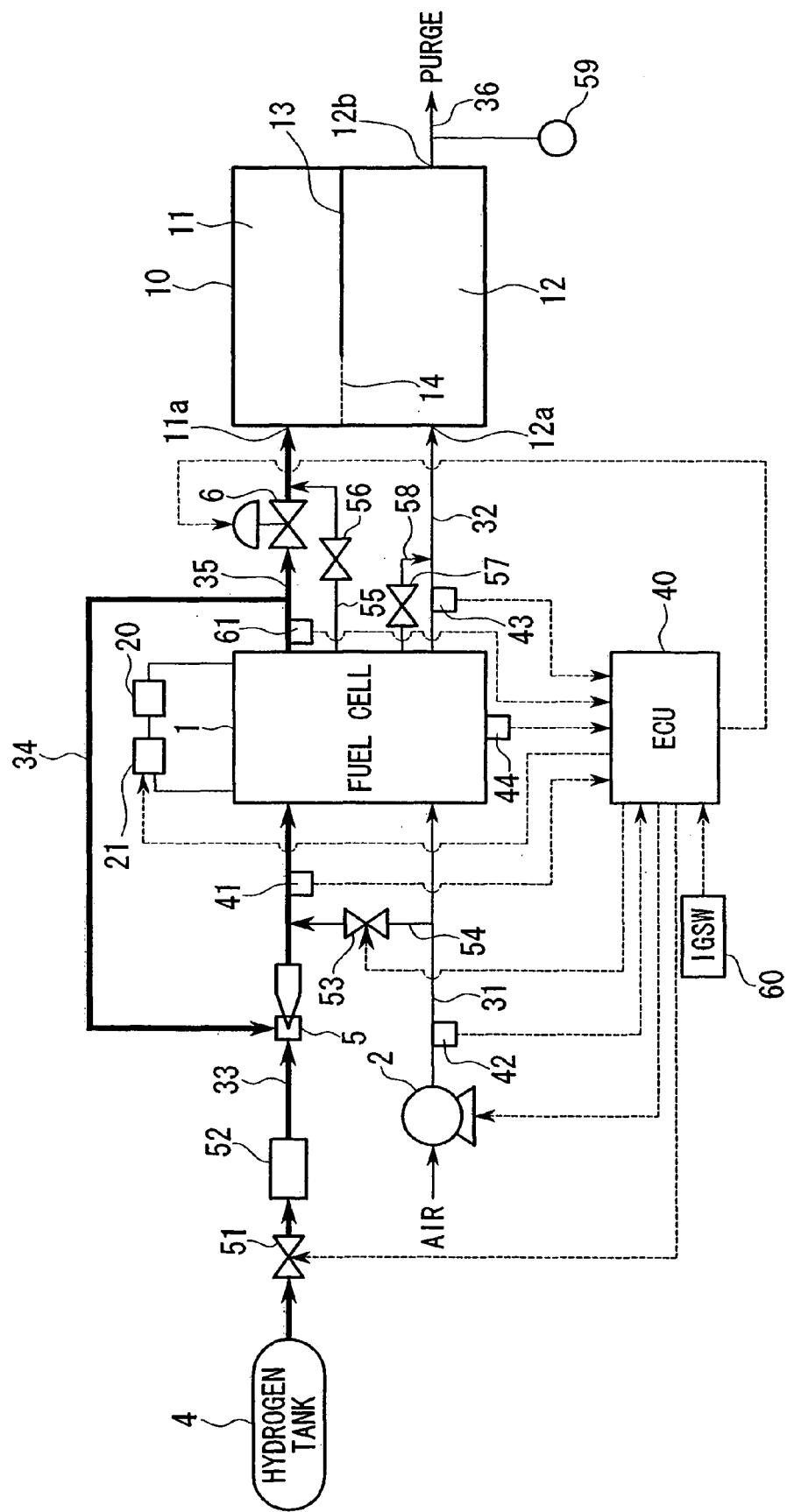
FIG. 1 is a schematic block diagram showing a fuel cell system to which a stop method for a fuel cell system according to one embodiment of the present invention is applied.

FIG. 1 is a schematic block diagram showing a fuel cell system to which a stop method for a fuel cell system of the present embodiment is applied.

A fuel cell 1 is a stack that is formed by stacking a plurality of fuel cell units, each of which includes a solid polymer electrolyte membrane consisting of, for example, a solid polymer ion exchange membrane, and an anode and a cathode that sandwich the solid polymer electrolyte membrane therebetween. When hydrogen as a fuel gas is supplied to the anode, and air containing oxygen as an oxidizing gas is supplied to the cathode, hydrogen ions are produced in the anode area by catalytic reaction, which pass through the solid polymer electrolyte membrane, and which reach the cathode area where the hydrogen ions electrochemically react with oxygen so that electrical power is generated, and water is formed. Because a portion of the water formed in the cathode area permeates the solid polymer electrolyte membrane so as to diffuse into the anode area, there is also water in the anode area.

Air is pressurized by a compressor 2 to a predetermined pressure, and the pressurized air is supplied to the cathode of each of the fuel cell units of the fuel cell 1 through an air supply path 31. The air supply path 31 is provided with a humidifier (not shown) so that humidified air is supplied to the fuel cell 1 in order to prevent the solid polymer ion exchange membrane or the like from becoming dry. The air supplied to the fuel cell 1 is used for power generation, and is discharged from the fuel cell 1 to an air discharge path 32 along with condensed water contained in the cathode area, and then the discharged air is introduced into a purged hydrogen dilution unit 10. In addition to the air discharge path 32, a drain path 58 having a drain valve 57 is also connected to the cathode. In the following description, the air supplied to the fuel cell 1 is referred to as "supplied air", and the air discharged from the fuel cell 1 is referred to as "discharged air", respectively, in order to distinguish them from each other.

On the other hand, a hydrogen gas supplied from a hydrogen tank 4 is supplied to the anode of the fuel cell 1 via a shutoff valve (first valve) 51, a pressure regulator 52, and a hydrogen gas supply path 33. The hydrogen gas is also humidified by a humidifier (not shown) in a manner similar to the case of supplied air, and thus humidified hydrogen is supplied to the fuel cell 1. Unreacted hydrogen gas, i.e., unused hydrogen gas is discharged from the anode area to a hydrogen gas circulation path 34 along with condensed water contained in the anode area, and then the discharged hydrogen is introduced into the hydrogen gas supply path 33 via an ejector 5. In other words, the hydrogen gas discharged from the fuel cell 1 is mixed with a fresh hydrogen gas supplied from the hydrogen tank 4, and the mixture is supplied to the anode area of the fuel cell 1 again. A hydrogen pump may be used instead of the ejector 5.

A hydrogen gas discharge path 35, which includes a purge valve 6, branches off the hydrogen gas circulation path 34. The hydrogen gas discharge path 35 is connected to the purged hydrogen dilution unit 10.

The purged hydrogen dilution unit 10 is a container whose interior is divided by a partition 13 into a holding chamber 11 and a dilution chamber 12. The holding chamber 11 and the dilution chamber 12 are allowed to communicate with each other via a communication portion 14. The communication portion 14 includes, for example, a metal plate having a number of small holes therein (generally referred to as a "punched metal") or porous ceramics.

The aforementioned hydrogen gas discharge path 35 is connected to an inlet 11a of the holding chamber 11. When the purge valve 6 is opened, the hydrogen gas discharged from the fuel cell 1 flows into the holding chamber 11 via the hydrogen gas circulation path 34 and the hydrogen gas discharge path 35, and remains in the holding chamber 11.

The aforementioned air discharge path 32 is connected to an inlet 12a of the dilution chamber 12. The discharged air discharged from the fuel cell 1 flows into the dilution chamber 12 via the air discharge path 32. The fluid in the dilution chamber 12 is discharged from an outlet 12b, which is provided in the opposed side with respect to the inlet 12a, via a discharge pipe 36. Therefore, the discharged air flows in the dilution chamber 12 whenever the discharged air is being discharged from the fuel cell 1.

The air supply path 31 is provided with a flow sensor 42 for measuring flow rate of the supplied air that flows through the air supply path 31. The air discharge path 32 is provided with a temperature sensor 43 for measuring the temperature of the discharged air that flows through the discharge path 32. The hydrogen gas supply path 33 is provided with a pressure sensor 41, at a position downstream of the ejector 5, for measuring the pressure of hydrogen gas flowing through the hydrogen gas supply path 33 (i.e., the pressure of supplied hydrogen). The hydrogen gas discharge path 35 is provided with a pressure sensor 61 for measuring the pressure of an off-gas, containing an unreacted hydrogen gas, flowing through the hydrogen gas discharge path 35 (i.e., the pressure of the discharged off-gas). Furthermore, the fuel cell 1 is provided with a cell voltage sensor 44 for measuring cell voltage of each of the fuel cell units that constitute the fuel cell 1, and the discharge pipe 36 is provided with a hydrogen concentration sensor 59 for measuring concentration of hydrogen gas flowing through the discharge pipe 36. The output signals of the aforementioned sensors 41 to 44, 61, and 59, and ON and OFF signal of an ignition switch 60 are input into an ECU (Electronic Control Unit, controller) 40. In addition, as in the case of the cathode, a drain path 55 having a drain valve 56 is connected to the anode in addition to the hydrogen discharge path 35.

A switching path 54 having a switching valve (a second valve) 53 branches off the air supply path 31, and merges with the hydrogen gas supply path 33 at a downstream portion thereof with respect to the ejector 5. Accordingly, when the switching valve 53 is opened, air can be supplied to the hydrogen gas supply path 33.

The fuel cell 1 is provided with a dummy load 20 for purging process which is an electrical load connected between the anode and the cathode. The dummy load 20 for the purging process, which is connected to the fuel cell 1 via a contactor 21, is a resistor for releasing electrical energy in the fuel cell 1 when the anode and the cathode are electrically connected to each other. The resistance of the dummy load 20 for purging process is preferable to be changeable depending on the quantity of the remaining water, and the quantity of electrical power consumption in electrically powered auxiliaries such as the compressor 2. The dummy load 20 for purging process of the present invention and the electrically powered auxiliaries such as the compressor 2 driven by the fuel cell 1 are parallel with the fuel cell 1. Instead of the dummy load 20 for purging process, the electrically powered auxiliaries can be used as the electrical load connected between the anode and the cathode. The compressor 2 for supplying air to the cathode, a water pump for water-cooling the heat generated during power generation of the fuel cell 1, etc., can be adopted as the electrically powered auxiliaries.

According to the present embodiment, in the fuel cell system configured as described above, a purging operation is executed for a predetermined time by opening the purge valve 6 when power generation of the fuel cell 1 progresses slowly in order to remove water and nitrogen in the anode area.

During the purging operation in which the purge valve 6 is opened, hydrogen gas purged from the fuel cell 1 flows into the holding chamber 11, and diffuses in the entirety of the holding chamber 11. When the purge valve 6 is closed, flow of hydrogen gas into the holding chamber 11 is stopped. On the other hand, because the discharged air flows through the dilution chamber 12 regardless of opening and shutting of the purge valve 6, hydrogen gas remaining in the holding chamber 11 is gradually drawn into the dilution chamber 12 through the communication portion 14, and is mixed with the discharged air in the dilution chamber 12 so as to be diluted. As a result, it is possible to lower the hydrogen concentration of the gas discharged from the outlet 12b of the dilution chamber 12 to a level lower than a predetermined concentration, and gas at a low hydrogen concentration can be discharged from the discharge pipe 36.

Figure 2:
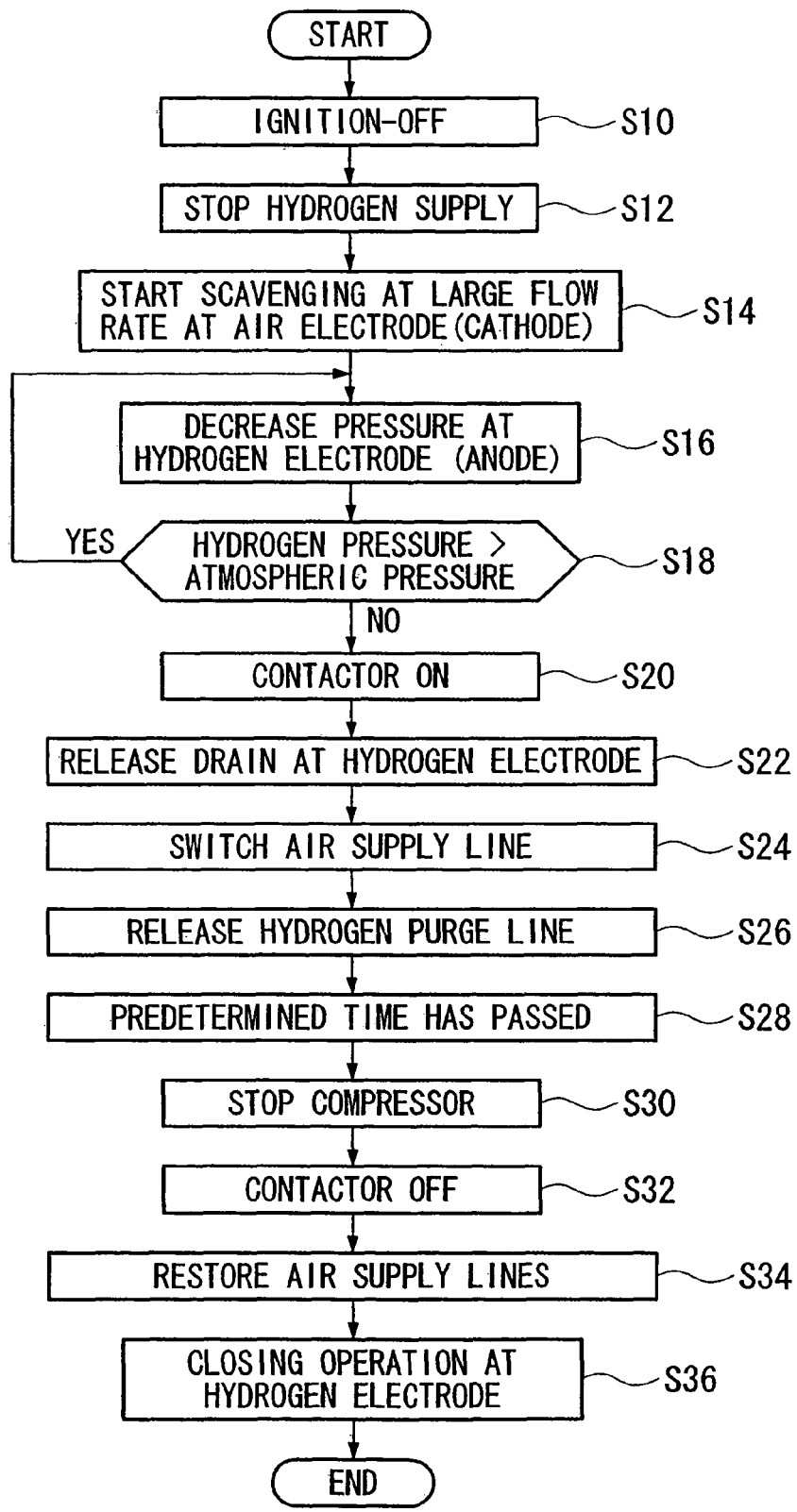
FIG. 2 is a flowchart showing processes for stopping the fuel cell system in the same embodiment.

The flowchart shown in FIG. 2 represents a control routine for stopping the fuel cell system according to the present embodiment.

First, in step S10, a stop signal of the ignition switch 60 (IGNITION-OFF signal) is input to the ECU 40, and in step S12, the shutoff valve 51 is closed so as to stop supply of a hydrogen gas to the anode.

Next, in step S14, an operation for discharging water remaining in the cathode area is started. During the operation for discharging water, hydrogen concentration in the purged hydrogen dilution unit 10 can be maintained to be lower than a predetermined level by supplying a sufficient amount of air into the purged hydrogen dilution unit 10.

Next, in step S16, an operation for decreasing pressure at the anode is performed.

In step S18, it is determined whether the hydrogen pressure at the inlet of the anode measured by the pressure sensor 41 is greater than a predetermined pressure (for example, atmospheric pressure). When the result of the determination is "YES", the operation returns to step S16, and when the result of the determination is "NO", the operation proceeds to step S20.

When supply of a hydrogen gas to the hydrogen gas circulation path 34 is stopped, and the pressure of gas in the hydrogen gas circulation path 34 is less than a predetermined pressure (for example, atmospheric pressure), it is determined that the hydrogen gas contained in the hydrogen gas circulation path 34 has been sufficiently discharged. Accordingly, by the subsequent supply of air into the hydrogen gas circulation path 34, water remaining in the anode area can be sufficiently discharged. In addition, since supply of the hydrogen gas to the hydrogen gas circulation path 34 is stopped, the amount of hydrogen gas consumed can be reduced.

In the abovementioned process, the hydrogen gas contained in the hydrogen gas circulation path 34 is discharged by periodically opening the purge valve 6. The hydrogen gas discharged from the hydrogen gas circulation path 34 is introduced into the holding chamber 11 of the purged hydrogen dilution unit 10. The hydrogen gas in the holding chamber 11 is diluted in the dilution chamber 12 by mixing with the discharged air, and is discharged from the outlet 12b. It is preferable that the hydrogen concentration of the discharged air be monitored by a hydrogen concentration sensor (not shown) or the like provided at the outlet 12b, and the purge valve 6 be controlled so that the hydrogen concentration is maintained to be less than a predetermined concentration.

The present embodiment adopted the following anti-corrosion method in order to prevent corrosion in the cathode area (corrosion of the cathode and a separator on the cathode side) during supplying air to the anode in step S20 and thereafter (to be explained later).

Firstly, the cause of the corrosion of the cathode and a separator on the cathode side will be explained. When supply of hydrogen gas ($H_2$) to the fuel cell 1 is stopped, there is a potential difference between the anode and the cathode, a potential difference inside the anode, and a potential difference inside the cathode. Then, by supplying air into an inlet of the anode, hydrogen ions ($H^+$) and electrons ($e^-$) are generated by the hydrogen gas ($H_2$) remaining in the inlet of the anode. That is, the chemical reaction shown in the following reaction formula (1) is obtained at the inlet of the anode.

$$H_2 \rightarrow 2H^+ + 2e^- \quad (1)$$

During the chemical reaction, hydrogen ions ($H^+$) moves to an inlet of the cathode through the solid polymer electrolyte membrane; however, electrons ($e^-$) remain inside the anode since they cannot pass through the solid polymer electrolyte membrane.

On the other hand, at the exit of the anode, during normal operation, hydrogen ions ($H^+$) produced by supplied hydrogen gas ($H_2$) reacts with oxygen gas ($O_2$) and electrons ($e^-$) remaining in the anode area and thereby produce water ($H_2O$). That is, the chemical reaction shown in the following reaction formula (2) is obtained at the outlet of the anode.

$$\tfrac{1}{2}O_2 + 2H^+ + 2e^- \rightarrow H_2O \quad (2)$$

However, when supply of hydrogen gas to the fuel cell 1 is stopped, the chemical reaction shown in the abovementioned reaction formula (2) cannot be obtained due to the shortage of hydrogen ions ($H^+$) which is necessary for the chemical reaction with electrons ($e^-$).

In addition, during normal operation, at the cathode, hydrogen ion ($H^+$) produced at the anode react with oxygen gas ($O_2$) and electrons ($e^-$), and thereby produces water ($H_2O$). That is, the chemical reaction shown in the following reaction formula (3) is obtained at the cathode.

$$\tfrac{1}{2}O_2 + 2H^+ + 2e^- \rightarrow H_2O \quad (3)$$

However, when supply of hydrogen gas to the fuel cell 1 is stopped, the chemical reaction shown in the abovementioned reaction formula (3) cannot be obtained due to the shortage of electrons ($e^-$) at the cathode.

Therefore, chemical reactions for obtaining electrons ($e^-$) from the separator, the cathode, etc., each having electrons ($e^-$) near the cathode, are performed. That is, chemical reactions shown in the following reaction formulas (4) and (5) are obtained.

$$2Cr + 7H_2O \rightarrow Cr_2O_7^{2-} + 14H^+ + 12e^- \quad (4)$$

$$C + 2H_2O \rightarrow CO_2 + 4H^+ + 4e^- \quad (5)$$

As a result of the chemical reactions shown in the reaction formulas (4) and (5), the separator is oxidized, and thereby hydrogen ions ($H^+$) are produced. These hydrogen ions ($H^+$) move from the cathode to the outlet of the anode where there is a shortage of hydrogen ions ($H^+$), through the solid polymer electrolyte membrane. Thereafter, as shown in the reaction formula (3), at the exit of the anode, hydrogen ions ($H^+$) react with oxygen gas ($O_2$) contained in air and electrons ($e^-$) remaining inside the anode, and water ($H_2O$) is thereby produced.

In the case in which such chemical reactions proceed, oxidation of the separator at the cathode side proceeds, and thereby the corrosion of the separator on the cathode side and the corrosion of the cathode proceed.

In the present embodiment, in order to prevent the corrosion of the separator on the cathode side and the corrosion of the cathode, the anode and the cathode are electrically connected to each other when air is supplied to the anode while stopping supply of hydrogen gas ($H_2$) to the fuel cell 1. In this way, since electrons ($e^-$) remaining inside the anode move to the cathode side, electrons ($e^-$) will not be removed from the separator, and thereby chemical reactions shown in the abovementioned reaction formulas (4) and (5) will be prevented. Then, at the cathode, hydrogen ions ($H^+$) react with oxygen gas ($O_2$) and electrons ($e^-$), and thereby produces water ($H_2O$). Accordingly, chemical reactions shown in the abovementioned reaction formulas (4) and (5) will not proceed, and corrosion of the separator on the cathode side and the cathode can be prevented. As explained above, since oxidation of the separator and the cathode can thereby be prevented, corrosion thereof also can be prevented.

In step S20, in order to prevent corrosion of the separator, the anode and the cathode are electrically connected to each other via the dummy load 20 for purging process by turning on the contactor 21. In step S22, the drain valve 56 is opened, and the drain path (a drain at a hydrogen electrode) 55 is thereby released. In step S24, the switching valve 53 is opened so as to allow air in the air supply path 31 to flow into the hydrogen gas supply path 33 via the switching path 54, and supply of air to the anode is started. As a result, the drain path 55 is purged.

In step S26, the same as in a purging process of the drain path 55, the purge valve 6 is opened so as to execute a purging process through the hydrogen gas discharge path 35. In step S28, it is determined that a predetermined time has passed, and in step S30, the compressor 2 is stopped. In step S32, the contactor 21 is tuned OFF so as to terminate an electrical connection between the anode and cathode. In step S34, the switching valve 53 is closed so as to stop supply of air from the switching path 54 to the hydrogen gas supply path 33, and thus the fuel cell 1 is placed in a state before starting the operation for stopping power generation. In step S36, the purge valve 6 is closed so as to stop gas flow between the anode and the outside thereof, and thus the operations are completed.

As explained above, when the anode is to be made inactive, air is supplied to the anode after stopping supply of a hydrogen gas. Therefore, water remaining in the anode area can be discharged, and furthermore, the amount of hydrogen that is lost during the water discharging operation can be reduced. Accordingly, by discharging water remaining in the fuel cell 1 when the operation of the fuel cell 1 is to be stopped, start-up performance of the fuel cell system can be improved, and furthermore, the amount of hydrogen that is lost during the water discharging operation can be reduced.

Instead of the operation in step S28 explained above, pressure at the inlet of the anode and pressure at the outlet of the anode may be measured by the pressure sensors 41 and 61, and it may be determined that the discharge of remaining water has been completed when the difference between pressure at the inlet and pressure at the outlet becomes less than a predetermined threshold. In this case, sufficient discharging of water remaining in the gas path of the anode can be detected, and the time required for discharging water remaining in the gas path of the anode can thereby be shortened.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the humidifier may be omitted in the fuel cell system.

When supply of a hydrogen gas to the fuel cell units is stopped, the pressure of hydrogen at the anode is decreased; therefore, the pressure of air supplied to the cathode may be decreased in accordance with the pressure reduction at the anode. According to this method, the pressure difference between the electrodes (the anode and cathode), which applies force to the solid polymer ion exchange membrane, can be maintained in a preferable range. Moreover, it is preferable that the pressure of air supplied to the cathode be decreased in accordance with the pressure at the anode so that the pressure difference between the electrodes is maintained to be less than a predetermined pressure.

What is claimed is:

1. A stop method for a fuel cell system that includes a fuel cell unit in which hydrogen is supplied to an anode, and air is supplied to a cathode so as to generate electrical power via an electrochemical reaction, the stop method for a fuel cell system comprising:
    firstly stopping a supply of hydrogen from an external source to the anode; and then
    electrically connecting the anode and the cathode via an electrical load after stopping the supply of hydrogen from the external source to the anode without stopping supplying the air to the cathode;
    supplying the air to the anode after connecting the load between the anode and the cathode while supplying the air to the cathode; and
    supplying the air to the cathode at a predetermined flow rate to discharge water from the cathode when stopping the supply of hydrogen.

2. The stop method for a fuel cell system according to claim 1, wherein
    during the step of supplying the air to the anode and the cathode, the anode and the cathode are electrically connected via the electrical load.

3. The stop method for a fuel cell system according to claim 1, wherein:
    the fuel cell unit is for a fuel cell powered vehicle; and
    the electrical load is electrically powered auxiliaries.

4. The stop method for a fuel cell system according to claim 3, wherein
    the electrically powered auxiliaries is an air compressor which supplies air to the cathode, or a water pump which supplies water to the fuel cell unit to cool down the fuel cell unit.

5. The stop method for a fuel cell system according to claim 1, wherein:
    the fuel cell unit is for a fuel cell powered vehicle; and
    the electrical load is a dummy load for a purging process.

6. The stop method for a fuel cell system according to claim 1, wherein
    unreacted hydrogen is supplied to the anode from a hydrogen circulation path through which the unreacted hydrogen is recirculated.

7. The stop method for a fuel cell system according to claim 1, further comprising:
    decreasing a gas pressure of hydrogen at the anode, between the step of stopping the supply of hydrogen to the anode and the step of electrically connecting the anode and the cathode via an electrical load.

8. The stop method for a fuel cell system according to claim 1, wherein
    a load amount of the electrical load is changeable depending on the amount of the remaining hydrogen in the anode before connecting the electrical load.

9. The stop method for a fuel cell system according to claim 1, further comprising:
   stopping the supply of the air to the anode and the cathode after a predetermined time has passed from a beginning the supply of the air to the anode and the cathode; and then
   electrically disconnecting between the anode and the cathode.

10. The stop method for a fuel cell system according to claim 1, further comprising releasing a hydrogen gas discharge path or a drain path, each connected to the anode, while supplying the air to the anode.

11. A stop method for a fuel cell system that includes a fuel cell unit in which hydrogen is supplied to an anode, and air is supplied to a cathode so as to generate electrical power via an electrochemical reaction, and a hydrogen circulation path through which unreacted hydrogen is returned to the anode, the stop method for a fuel cell system comprising:
   firstly stopping a supply of hydrogen from an external source to the hydrogen circulation path; and then
   electrically connecting the anode and the cathode via an electrical load after stopping the supply of hydrogen from the external source to the hydrogen circulation path without stopping supplying the air to the cathode and when it is determined that a gas pressure in the hydrogen circulation path becomes lower than a predetermined pressure;
   supplying the air to the hydrogen circulation path and the cathode after connecting the anode and the cathode electrically via the electrical load; and
   supplying the air to the cathode at a predetermined flow rate to discharge water from the cathode when stopping the supply of hydrogen.

12. The stop method for a fuel cell system according to claim 11, wherein:
   the fuel cell unit is for a fuel cell powered vehicle; and
   the electrical load is electrically powered auxiliaries.

13. The stop method for a fuel cell system according to claim 12, wherein
   the electrically powered auxiliaries is an air compressor which supplies air to the cathode, or a water pump which supplies water to the fuel cell unit to cool down the fuel cell unit.

14. The stop method for a fuel cell system according to claim 11, wherein:
   the fuel cell unit is for a fuel cell powered vehicle; and
   the electrical load is a dummy load for a purging process.

15. The stop method for a fuel cell system according to claim 11, wherein
   a load amount of the electrical load is changeable depending on the amount of the remaining hydrogen in the hydrogen circulation path before connecting the electrical load.

16. The stop method for a fuel cell system according to claim 11, further comprising decreasing a pressure of air supplied to the cathode in accordance with a pressure reduction at the anode.

* * * * *